(12) United States Patent
Kuga et al.

(10) Patent No.: US 8,014,842 B2
(45) Date of Patent: Sep. 6, 2011

(54) SLIDING TYPE MOBILE TERMINAL

(75) Inventors: Ayako Kuga, Hiroshima (JP); Kohichi Matsuda, Hiroshima (JP); Kimiaki Imai, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 710 days.

(21) Appl. No.: 11/873,194

(22) Filed: Oct. 16, 2007

(65) Prior Publication Data
US 2008/0096619 A1  Apr. 24, 2008

(30) Foreign Application Priority Data
Oct. 19, 2006 (JP) .................. 2006-284825

(51) Int. Cl.
H04M 1/00 (2006.01)

(52) U.S. Cl. .................. 455/575.4; 455/90.3; 455/575.1; 455/550.1

(58) Field of Classification Search .............. 455/575.4, 455/575.1, 90.3, 566, 550.1, 575.3
See application file for complete search history.

(56) References Cited

U.S. PATENT DOCUMENTS

| 7,529,571 | B2 | 5/2009 | Byun et al. | |
|---|---|---|---|---|
| 7,546,150 | B2* | 6/2009 | Makino | 455/575.1 |
| 7,567,830 | B2* | 7/2009 | Hur | 455/575.4 |
| 2006/0025184 | A1 | 2/2006 | Cho et al. | |
| 2006/0114646 | A1 | 6/2006 | Koibuchi et al. | |
| 2006/0172764 | A1 | 8/2006 | Makino | |
| 2006/0211460 | A1* | 9/2006 | Jeong et al. | 455/575.4 |
| 2006/0223596 | A1 | 10/2006 | Hur | |
| 2007/0293283 | A1* | 12/2007 | Inubushi et al. | 455/575.1 |
| 2008/0004083 | A1 | 1/2008 | Ohki et al. | |
| 2008/0045279 | A1* | 2/2008 | Ohki | 455/575.1 |

FOREIGN PATENT DOCUMENTS

| CN | 1725772 A | 1/2006 |
|---|---|---|
| EP | 1686768 A2 | 8/2006 |
| JP | 2003-338866 A | 11/2003 |
| JP | 2005-109971 A | 4/2005 |
| JP | 2005-147401 | 6/2005 |
| JP | 2006-115109 A | 4/2006 |
| JP | 2006-211576 A | 8/2006 |
| JP | 2006-237812 A | 9/2006 |
| KR | 10-2006-0011454 A | 2/2006 |
| WO | WO 2006/038499 A1 | 4/2006 |

* cited by examiner

*Primary Examiner* — John Lee
(74) *Attorney, Agent, or Firm* — Birch, Stewart, Kolasch & Birch, LLP

(57) ABSTRACT

A sliding mechanism is provided to couple slidably a first housing having on its surface a vertically long liquid crystal display part long in the vertical direction to a second housing having on its surface an operating part. This slide mechanism includes a rail part which is mounted on the surface of the second housing in a manner of extending in the vertical direction and is configured such that when the first housing has slidingly moved by means of the slide mechanism to the upper end side of the second housing, the operating part of the second housing will appear. Further, by means of the cam mechanism (support mechanism), the first housing is supported relative to the second housing in a switchable manner between the vertically long state and the horizontally long state.

22 Claims, 11 Drawing Sheets

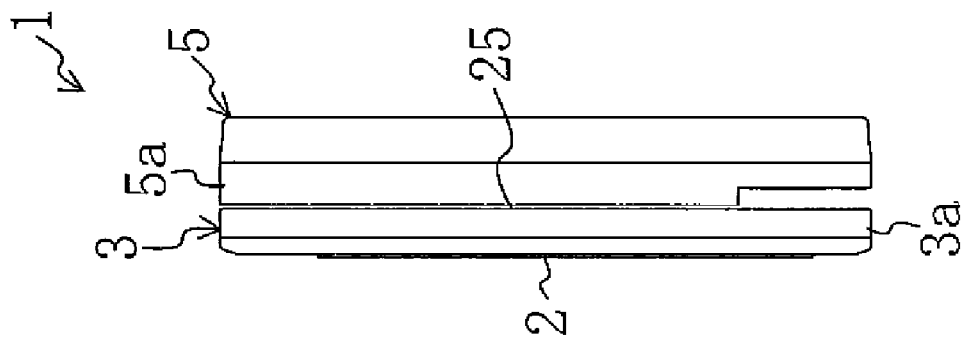
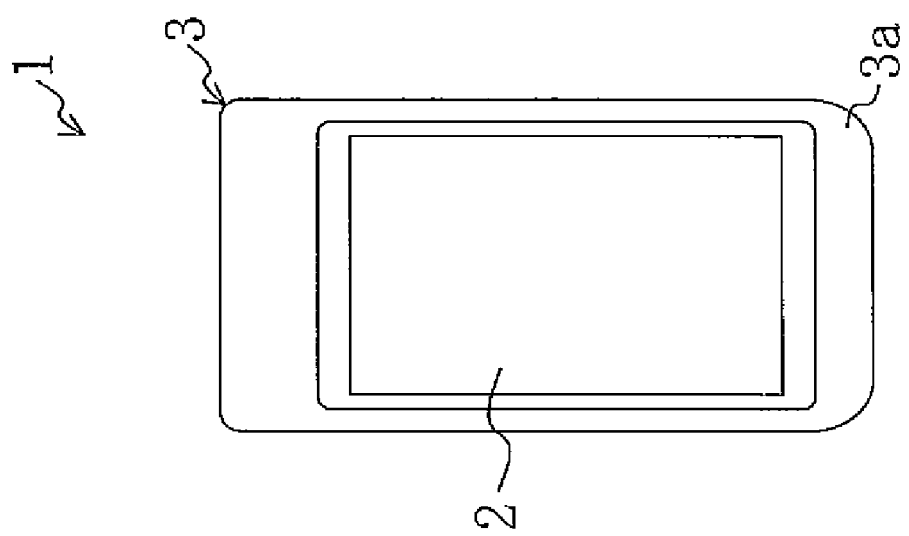

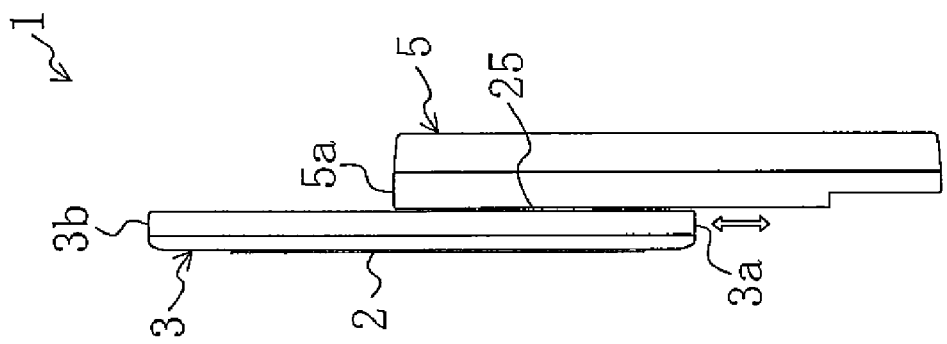
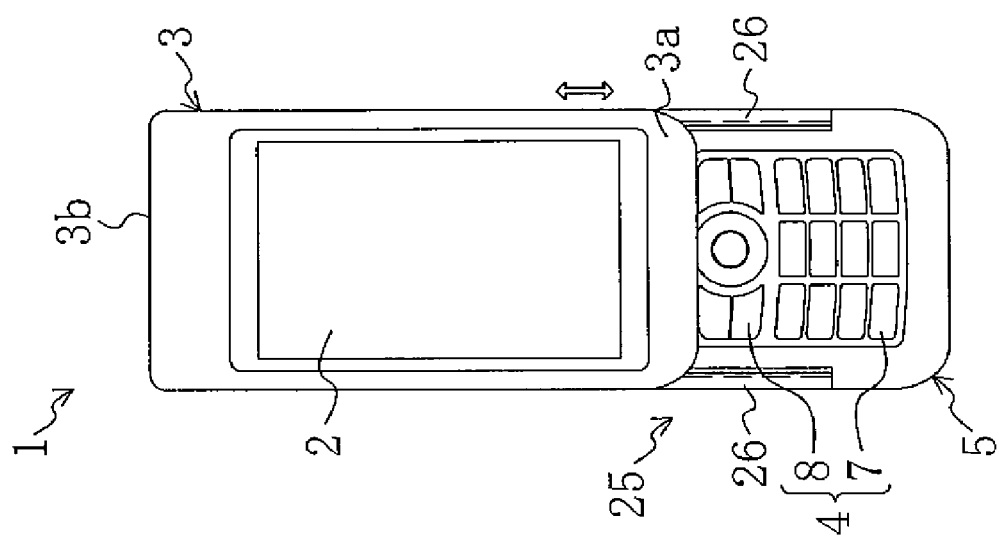

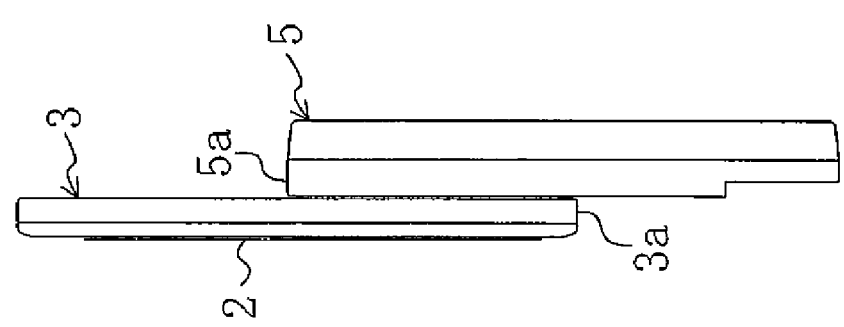
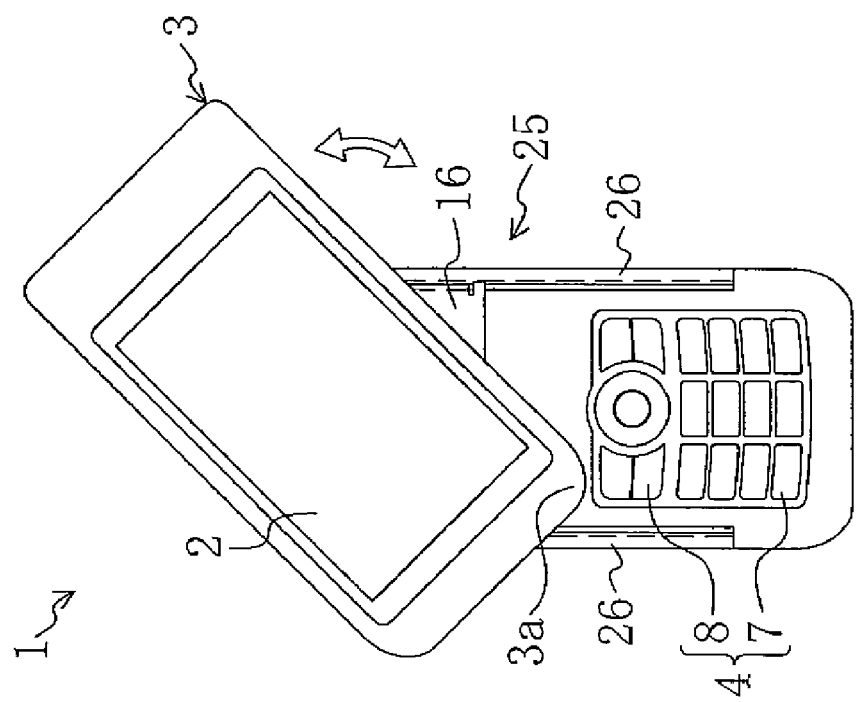

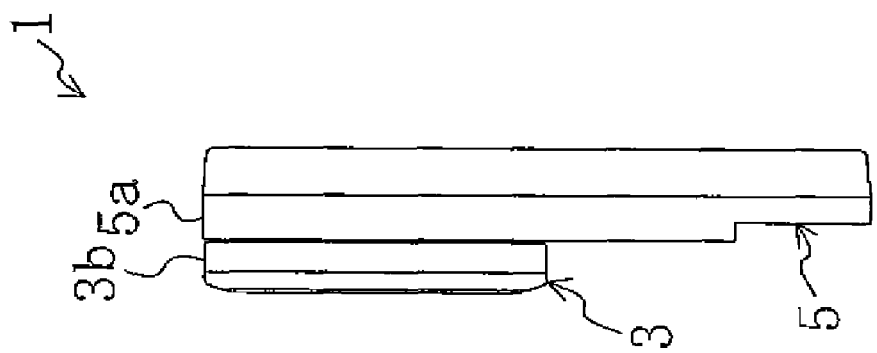
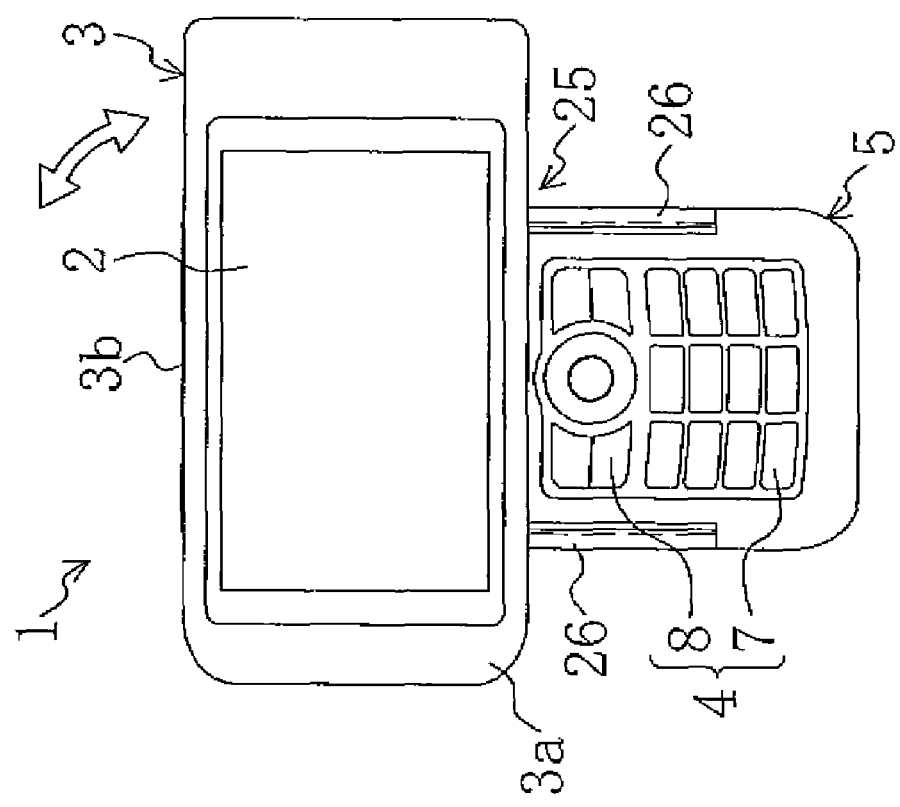

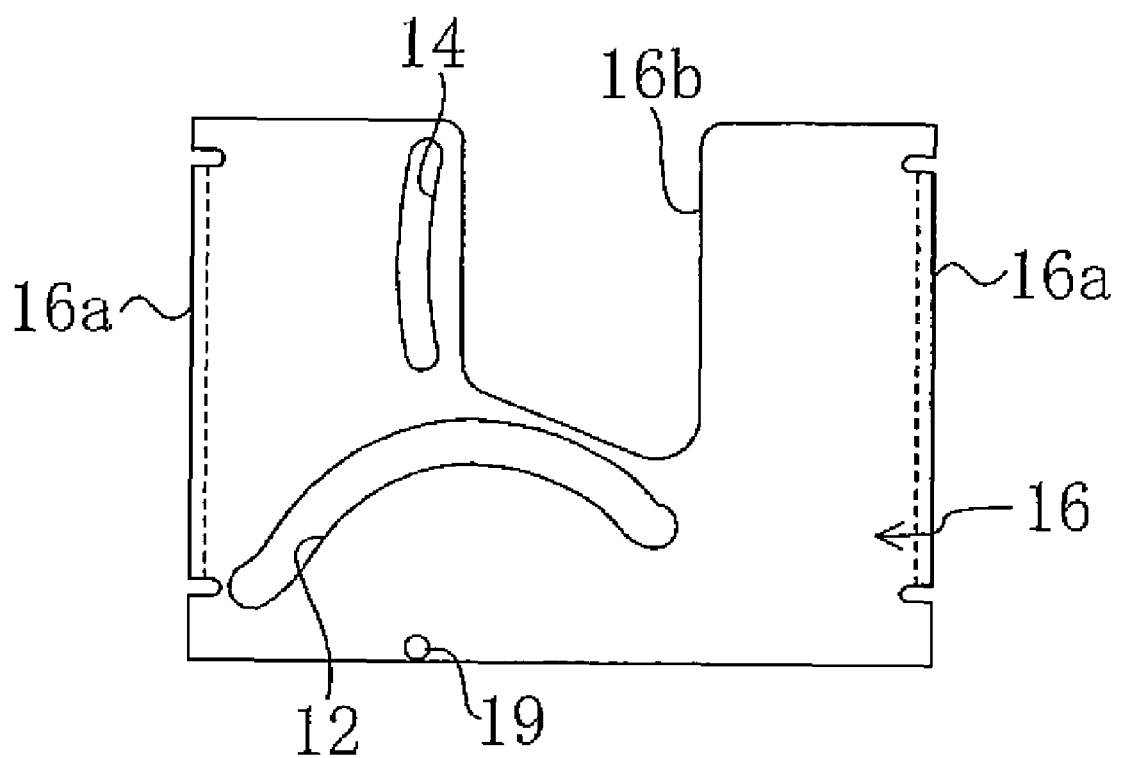

SLIDING TYPE MOBILE TERMINAL

This non-provisional application claims priority based on Patent Application No. 2006-284825 filed in Japan on Oct. 19, 2006, the entire contents of which are hereby incorporated by reference.

BACKGROUND OF THE INVENTION

1. Field of the Invention

The present invention relates to a sliding type mobile terminal such as mobile phones, mobile wireless communication equipment and the like, in which a first housing and a second housing are slidably coupled together.

2. Description of the Related Art

Recently, a one segment receiving service for mobile phones and mobile wireless communication equipment, which has captured attention as a service unique to terrestrial digital TV broadcasting, has started to be offered, and this service is commonly known as "One Seg".

"One Seg" is a service realized by Japan's exclusive broadcasting system that splits a 6-megahertz band for terrestrial digital TV broadcasting into 13 segments to be sent. The middle segment of the 13 segments alone provides images, voice, and data. Further, what is different from normal TV is the advantage of receiving TV images in an undisturbed manner even while on the move. A further increase in the number of users is expected. Consequently, it is expected that a TV receiving function will be indispensable to the mobile phones and mobile wireless communication equipment.

On the other hand, the telephone call function of the mobile phone continues to be its main function. Further, because of its portability, smaller size and lighter weight have become important merchandising factors. In view of emphasis on usability, the mobile phone is vertically long with its width restricted.

When the display part is fixed in a vertically long state, to display an image horizontally long, it was necessary to give a reduced display to fit it into the vertically long screen or see the entire image by horizontal scroll operation.

For example, as shown in Japanese Unexamined Patent Application Publication No. 2006-115109, there is known a mobile information terminal composed of a body with an operating part and a cover superposed on the operating part side of the body and slidable along the operating part from the superposed state. In such sliding type mobile information terminal, when the cover in the superposed state on the body is held horizontally so that the display part provided on the cover may be in a horizontally long state, TV reception in the horizontally long state is possible.

Incidentally, contrary to the conventional analog broadcasting, the terrestrial digital TV broadcasting provides the user with what is called two-way service such that the user can participate in a quiz program on TV or to do TV shopping and make bank remittance through TV.

When viewing on terrestrial digital TV broadcasting through the mobile phone and the like is made possible, operating the keys at the operating part while viewing images at the display part becomes all the more necessary.

However, the terminal disclosed in the Japanese Unexamined Patent Application Publication No. 2006-115109 has only simple operating keys provided on the cover. Further, if the user holds it in the horizontally long state with the cover being slid to show the display part, the operating part is also turned by 90° so that denotation on the operating keys is positioned at the 90° turn as seen by the user. In addition, because the operating key arrangement differs from the usual arrangement, there was a problem that made an input operation extremely difficult.

In view of this, for example, in Japanese Unexamined Patent Application Publication No. 2003-338866, the mobile phone comprises a body housing a group of buttons such as dial buttons as well as various electronic circuits, and a display part of the same size as the body to enable it to be lapped thereon and fitted. The body is provided with a pin having a circular plate attached on top of a protrusion at the upper part of the surface side of the body, while the display part is provided with a cam part from the upper end to a substantially central position in the vertically long direction of the back surface side of the display part, the cam part being made up of a groove with a T-shape cross part to fit the pin provided on the body. The pin is inserted into the cam part of the display part, thus providing a slidable structure.

In the mobile phone of such construction, there is an advantage of performing normal key operation with its display part in the horizontally long state where receiving a telecast of two-way service such as TV shopping and when preparing mail in English.

However, in the mobile phone of Japanese Unexamined Patent Application Publication No. 2003-338866, the pin which is a pivot of sliding movement and rotation of the display pail is positioned at the upper end of the body, and there is only one pin for the display part to slide and rotate by being held by a single hand, causing a poor balance and thus creating a problem of growing ricketiness over years. Further, since the pin is located at the upper end of the body, when the display part is placed in the horizontally long state, the upper end of the display part is placed further above the upper end of the body, causing a problem of poor stability when the body is placed on the desk.

Conversely, when the pin is positioned lower from the upper end of the body downward to increase a sense of stability, the region for the operating part has to be made smaller, so that ideal button arrangements could not be hoped for, resulting in poor operability. To prevent this would necessitate enlarging the exterior shape of the product, then giving rise to a problem of worsening portability.

SUMMARY OF THE INVENTION

The present invention has been made in view of these problems. It is an object of the present invention to provide a sliding type mobile terminal such that, while maintaining overall compactness, a first housing is stably supported in a sliding-movable manner and in a manner that enables switching between the vertically long state and the horizontally long state, and that even when the first housing is set in the horizontally long state, operation under the normal key arrangement is made possible.

To accomplish the foregoing object, in the present invention, a support mechanism is provided to support a first housing which is slidable on a rail part in such a manner that makes the first housing switchable between the vertically long state and the horizontally long state relative to the second housing.

Specifically, a first aspect of the invention is drawn to a sliding type mobile terminal including a first housing having on a surface thereof a vertically long display part in a vertical direction, a second housing having on a surface thereof an operating pall, and a slide mechanism slidably coupling the first housing and the second housing.

The slide mechanism is provided with a rail part mounted to extend in the vertical direction on the surface of the second housing such that the operating part of the second housing appears when the first housing is slidingly moved toward ail upper end side of the second housing.

The sliding type mobile terminal includes a support mechanism supporting the first housing in a manner that makes the first housing switchable between a vertically long state and a horizontally long state relative to the second housing.

According to the foregoing configuration, after the first housing is slidingly moved to the upper end side of the second housing stably through the rail part of the slide mechanism, the second housing appears to enable telephone calls and mail communication. Further, since the first housing becomes switchable between the vertically long state and the horizontally long state relative to the second housing, operation under the normal key arrangement is possible while looking at the screen in the horizontally long state.

In a second aspect of the invention, the slide mechanism is disposed between a back side of the first housing and the surface of the second housing and is provided with a plate part slidingly moving on the rail part. The support mechanism is disposed on the plate part.

According to the foregoing configuration, the construction of mounting the support mechanism on the plate part which slidingly moves on the rail part secures, with a simple structure, sliding movement and the switching operation between the vertically long state and the horizontally long state. Further, since the plate part and the support mechanism are provided at a limited space between the back side of the first housing and the surface of the second housing, the sliding type mobile terminal becomes compact.

In a third aspect of the invention, the support mechanism is constituted of a cam mechanism.

According to the configuration described above, by devising the groove shape and arrangement of the cam mechanism, it becomes possible to properly control trajectory of rotational movement in the switching operation of the first housing, thereby enabling the entire sliding type mobile terminal to be made compact.

In a fourth aspect of the invention, the cam mechanism supports the first housing while guiding switching of the first housing between a vertically long state and a horizontally long state such that a lower end side corner part of the first housing may move on a straight line trajectory.

According to the configuration, since the trajectory of switching between the vertically long state and the horizontally long state of the first housing is in a straight line, the movement during switching between the vertically long state and the horizontally long state of the first housing is rendered smooth, thereby facilitating the switching operation.

In a fifth aspect of the invention, a central part in the vertically long state and in the horizontally long state of the first housing are positioned substantially at a central part in the horizontal direction of the second housing.

According to the configuration, since the first housing in the horizontally long state is positioned at substantially the center ill the horizontal direction of the second housing, when the user holds it by one hand or puts it on a desk, stability is good with fine appearance as well.

In a sixth aspect of the invention, when the first housing is in the horizontally long state, the operating part appears from a down side, presenting a substantially T-shape when seen from the surface.

According to the configuration, while looking at the display part in the horizontally long state, the user can hold the second housing with a single hand and operate under the normal key arrangement.

In a seventh aspect of the invention, when the first housing is switched from the vertically long state to the horizontally long state, all upper side of the first housing in the horizontally long state and an upper side of the second housing match.

According to the configuration, when the first housing is in the horizontally long state, the first housing does not protrude beyond the upper end of the second housing, and hence, stability is good with fine appearance as well.

In an eighth aspect of the invention, the cam mechanism includes: a curved horizontal guide groove provided on the plate part, extending substantially in the horizontal direction, and curved in a moderately convex form; a vertical guide groove provided on the plate part and extending substantially in the vertical direction; a first guide pin provided on the back side of the first housing and slidably engaging with the horizontal guide groove; and a second guide pin provided on the back side of the first housing and slidably engaging with the vertical guide groove.

According to the configuration, the first guide pin of the first housing in the state of engaging with the horizontal guide groove moves slidably horizontally through the cam mechanism, while at the same time the second guide pin of the first housing ill lie state of engaging with the vertical guide groove slidingly moves in the vertical direction. As a result of the movement restriction by the cam mechanism, the first housing is switched to the vertically long state or the horizontally long state such that its lower end side corner part moves in a straight line trajectory. Further, because the vertical movement and the rotational movement are carried out all at once by the cam mechanism, it is not necessary to arrange the first and the second guide pins on the upper end side of the second housing. Since the first housing is supported by the second housing at these two guide pins arranged in the middle of the second housing, the first housing is surely prevented from ricketiness.

In a ninth aspect of the invention, the sliding type mobile terminal includes a first restrictive member restricting switching of the first housing from the vertically long state to the horizontally long state while the first housing slidingly moves relative to the second housing.

According to the above configuration, since the first housing is prevented from rotating by the first restrictive member while the first housing is sliding and moving, the sliding movement is carried out stably and surely.

In a tenth aspect of the invention, the first housing has a rotation preventing protrusion disposed in a protruding manner on the back side of the first housing.

The first restrictive member restricts movement of the rotation preventing protrusion.

According to the configuration, since the first restrictive member restricts the movement of the rotation preventing protrusion on the back side of the first housing, the first housing does not rotate while sliding and moving, and the sliding movement is carried out stably and surely.

In an eleventh aspect of the invention, the first restrictive member is made up of a straight line restrictive protrusion provided on the surface of the second housing and is positioned in the vicinity of the rotation preventing protrusion to restrict switching of the first housing from the vertically long state to the horizontally long state.

According to the configuration, restriction by the rotation preventing protrusion can be performed with a simple configuration, and the sliding movement is carried out stably and surely.

In a twelfth aspect of the invention, while the first housing slidingly moves relative to the second housing, the rotation preventing protrusion slidingly moves in the vicinity of the restrictive protrusion.

Upon completion of the sliding movement, the rotation preventing protrusion moves away from the restrictive protrusion.

According to the configuration, when the first housing is slidingly moving, if an attempt is made to switch the first housing from the vertically long state to the horizontally long state, the rotation preventing protrusion abuts on the restrictive protrusion thus to restrict such movement, and hence, the first housing is not switched to the horizontally long state. On the other hand, as the rotation preventing protrusion moves away from the restrictive protrusion upon completion of the sliding movement, the restriction on the rotation preventing protrusion is released to enable movement. Consequently, the first housing becomes switchable from the vertically long state to the horizontally long state.

In a thirteenth aspect of the invention, the rotation preventing protrusion sticks out further to the second housing side than the first guide pin and the second guide pin.

According to the configuration, the height of the restrictive protrusion is arranged such that there is no contact with the first guide pin and the second guide pin but there is contact with the rotation preventing protrusion. As a result, through a simple configuration, while restricting switching of the first housing from the vertically long state to the horizontally long state during the sliding movement, the switching operation of the first housing is made possible after the sliding movement.

In a fourteenth aspect of the invention, the plate part is provided with a contact preventing opening with an open upper side to prevent contact with the rotation preventing protrusion.

According to the configuration, the rotation preventing protrusion is prevented from contacting with the plate part while the first housing is being switched to the horizontally long state or the vertically long state. Further, lighter weight and further compactness are made possible by the removed portion.

In a fifteenth aspect of the invention, the sliding type mobile terminal includes, in the state where the vertically long state is switched to the horizontally long state upon completion of the sliding movement of the first housing, a second restrictive member restricting recurrence of sliding movement of the first housing.

According to the configuration, when the first housing is in the horizontally long state, the first housing does not slidingly move again due to the second restrictive member, thereby securing the horizontally long state. As a result, better operability is gained in the horizontal long state. On the other hand, after the horizontally long state is turned back to the vertically long state, the sliding movement is made possible.

In a sixteenth aspect of the invention, the second restrictive member restricts movement of the first guide pin.

According to the configuration, the second restrictive member restricts the first guide pin moving horizontally in the switching operation of the first housing in the switching operation of the first housing. As a result, in the state of switching to the horizontally long state, the first housing returns from the horizontally long state to the vertically long state while restricting the recurrence of sliding movement of the first housing, thereby causing the first guide pin to move away from the second restrictive member and making the first housing slidable. In this manner, release of the sliding movement of the first housing is easily made possible.

In a seventeenth aspect of the invention, the second restrictive member is made up of a restrictive protrusion disposed in a protruding manner in the vicinity of the first guide pin in the second housing when the first housing is in the horizontally long state to restrict downward sliding movement of the first housing.

According to the configuration, the second restrictive member made up of a protrusion restricts downward movement of the first guide pin moving horizontally in the switching operation of the first housing, thereby preventing the sliding movement of the first housing. Since the second restrictive member is made up of a protrusion, all that is needed is a small space for the member to occupy. Consequently, in the switching operation and sliding movement of the first housing, the second restrictive member is prevented from obstructing these movements.

In an eighteenth aspect of the invention, the vertical guide groove is set parallel to the rail part.

In a nineteenth aspect of the invention, the vertical guide groove is inclined relative to the rail part.

According to the configuration, by adjusting the angle of inclination of the vertical guide groove, the horizontal guide groove can be shaped into a circular arc. As a result, the switching operation of the first housing becomes smooth. Further, by inclining the vertical guide groove, the member forming the vertical guide groove can be cut to the vicinity of the vertical guide groove, thus enabling lighter weight and compactness by the cut part.

In a twentieth aspect of the invention, the vertical guide groove has a curved profile which makes a curvature.

According to the configuration, by curving the vertical guide groove as necessary and adjusting the shape of the horizontal guide groove accordingly, it is possible to make the first housing movement smooth, and by cutting the member forming the vertical guide groove, lighter weight and compactness are made possible by the curt part.

In a twenty-first aspect of the invention, the support mechanism is provided with an elastic member with one end fixed to the first guide pin and the other end fixed to the plate part, thereby biasing the first housing to secure that the first housing is in the vertically long state or in the horizontally long state.

According to the configuration, by adjusting the degree of bias power of the elastic member applied to the first housing, the switching of the first housing from the vertically long state to the horizontally long state or from the horizontally long state to the vertically long state or the switching of both is assisted by the elastic member.

In a twenty-second aspect of the invention, the elastic member is so arranged as to be most compressed in the vicinity of a top point of the horizontal guide groove.

According to the configuration, the power of the elastic member is most stored in the vicinity of the top point of the horizontal guide groove, and by crossing that top point, the switching from the vertically long state to the horizontally long state or from the horizontally long state to the vertically long state is assisted by the elastic member.

In a twenty-third aspect of the invention, the elastic member is a torsion coil spring.

According to the configuration, the elastic member is realized through a simple but hard to break constitution.

In a twenty-fourth aspect of the invention, the support mechanism is provided with a link member, and the first guide pin and the second guide pin are provided on the back side of the link member, while the surface side is attached to the first housing.

According to the configuration, by fitting the link member to the first housing, the first guide pin and the second guide pin are attached to preset positions of the first housing.

In a twenty-fifth aspect of the invention, the plate part and the link member are assembled in a unit.

According to the configuration, by subjecting the plate part and the link member to unit assembly, the first guide pin and the second guide pin can be arranged in good accuracy inside each guide groove, while at the same time the support mechanism can be easily attached to the first housing. Further, by inserting the plate part into the rail part, the first housing can be easily fitted to the second housing.

In a twenty-sixth aspect of the invention, the plate part is made up of sheet metal.

According to the configuration, processing is easy and low cost.

In a twenty-seventh aspect of the invention, the plate part is composed of a magnesium alloy molded product.

According to the configuration, a plate part of a lightweight, thin type having high rigidity and good durability is obtained, thereby maintaining the overall strength even though a guide groove is formed.

In a twenty-eighth aspect of the invention, the display part is provided with a liquid crystal display.

According to the configuration, the liquid crystal display is less expensive and more durable than an organic EL display.

In a twenty-ninth aspect of the invention, the display is provided with an organic EL display.

According to the configuration, the organic EL display has lower power consumption because of its light-emitting property and a wider viewing angle than the liquid crystal display. Further, since the organic EL display does not need any back light, it can be made thinner.

In a thirtieth aspect of the invention, a sliding type mobile terminal is a mobile wireless communication device.

According to the configuration, a sliding type mobile communication device can be obtained which can be operated under the normal key arrangement while the user is looking at the display part in the horizontally long state.

In a thirty-first aspect of the invention, the mobile wireless communication device is a mobile phone.

According to the configuration, in mobile phones, importance is placed on portability and design, compactness, good operability, comfortable TV viewing are made possible.

BRIEF DESCRIPTION OF THE DRAWINGS

FIG. 1 shows a sliding type mobile phone according to an embodiment of the present invention in a state prior to sliding: FIG. 1A is a front view, and FIG. 1B) is a right side view.

FIG. 2 shows a post-sliding state where a first housing slides relative to a second housing: FIG. 2A is a front view, and FIG. 2B is a right side view.

FIG. 3 shows a state where the first housing, after the post-sliding state of FIG. 2, is in the process of switching from a vertically long state to a horizontally long state: FIG. 3A is a front view, and FIG. 3B is a right side view.

FIG. 4 shows a state where the first housing is switched from the vertically long state to the horizontally long state: FIG. 4A is a front view, and FIG. 4B is a right side view.

FIG. 5 shows the sliding type mobile phone in the state prior to sliding when the first housing is removed.

FIG. 6 shows the state where the first housing is slidably moved upward as well as positions to which each pin and protrusions are moved.

FIG. 7 shows the state where the first housing is turned clockwise after making a sliding movement upward.

FIG. 8 shows the state where the first housing is turned further clockwise from the state of FIG. 8 and switching is made from the vertically long state to the horizontally long state.

FIG. 11 is a diagram equivalent to FIG. 9 showing the shapes of a vertical guide groove and a horizontal guide groove according to another embodiment.

DETAILED DESCRIPTION OF THE INVENTION

Figure 5A:
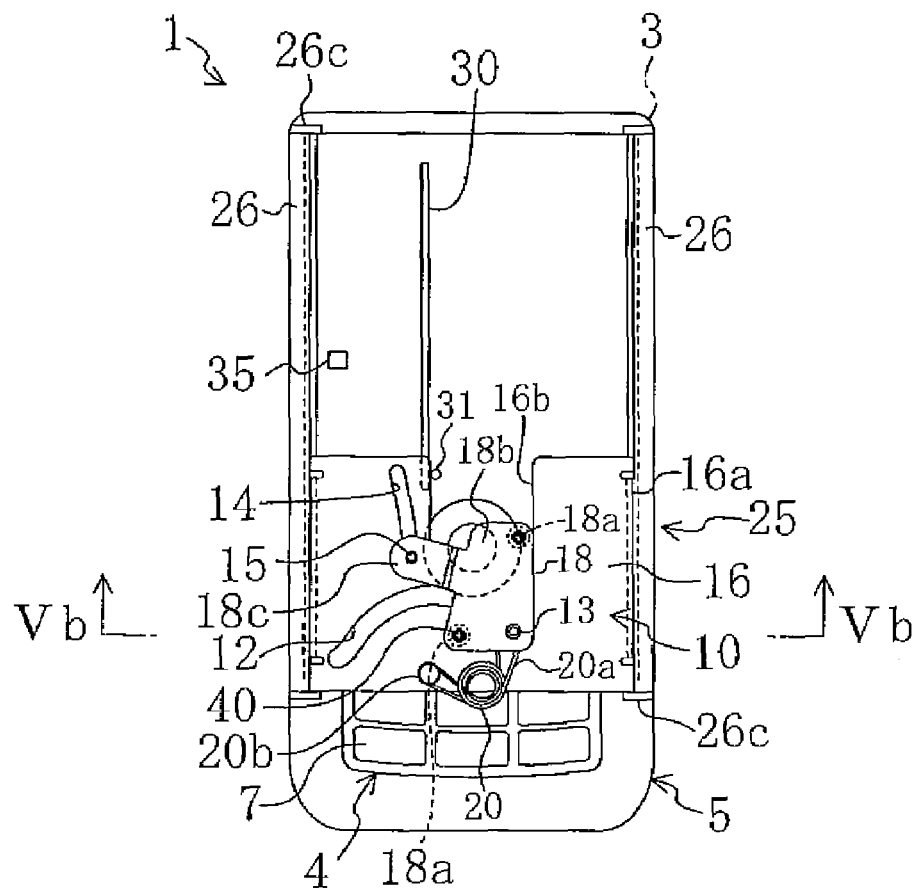
FIG. 5A is a front view.

With reference to the drawings, the embodiments of the present invention will herein-after be described in detail.

FIG. 1 shows a front view and a right side view of a sliding type mobile phone 1 as a sliding type mobile terminal according to an embodiment of the present invention in the state prior to sliding. FIG. 2 shows a front view and a right side view of a post-sliding state after a first housing 3 is slidably moved relative to a second housing 5. FIG. 3 shows a front view and a right side view of a state where the first housing 3, after the post-sliding state of FIG. 2, is in the process of switching from a vertically long state to a horizontally long state. FIG. 4 shows a front view and a right side view of a state where the first housing 3 is switched from the vertically long state to the horizontally long state.

The sliding type mobile phone 1 of the present embodiment is provided with the first housing 3 having on its surface a liquid crystal display part 2 as a display and a second housing 5 having on its surface an operating part 4. These first housing 3 and second housing 5 are slidably coupled through a slide mechanism 25 along a length direction (vertical direction) of the second housing 5. Through connecting means not illustrated, the first housing 3 and the second housing 5 are electrically connected. This enables the sliding type mobile phone 1 to switch between a compact pre-slide state shown in FIG. 1 and a post-slide state shown in FIG. 2.

The first housing 3 of FIG. 1 has a lower end part in a vertically long state which is formed in a straight line. The liquid crystal display part 2 is in a vertically long, rectangular shape which is long in the vertical direction and arranged to occupy the most part of the surface of the first housing 3. On the upper end side of the first housing 3 in its vertically long state is provided a speaker part (not illustrated) for conversation. Each corner part of the first housing 3, including a lower end side corner part 3a, is rounded off in terms of design or safety consideration.

On the operating part 4 of the second housing 5 are provided a plurality of input buttons 7 on the lower side of operating part 4, and on the upper side thereof are provided function buttons 8. These input buttons 7 and function buttons 8 are arranged in such a manner that the user can input with keys when holding the entire sliding type mobile phone in a vertically long manner, and are provided with a denotation displayed on the surface of each button. By operating the input buttons 7 and the function key 8, numerous functions of the sliding type mobile phone 1 can be utilized. The operating part 4 is constructed such as to appear when the first housing 3 is slidably moved upward relative to the second housing 5. Further, the second housing 5 is provided with a microphone pail for conversation, not illustrated.

As shown in FIG. 2 and FIG. 4, in this sliding type mobile phone 1, when the liquid crystal display part 2 is in either vertically long state or horizontally long state, the user can operate the input buttons 7 and the function buttons 8 of the operating part 4 in the same vertically long state while looking at the liquid crystal display part 2. In other words, when the first housing 3 is in the horizontally long state, the operating part 4 appears on the lower side, and a substantially T shape results when seen from the surface, so that the user, while holding the second housing 5 with a single hand, can look at the horizontally long liquid crystal display part 2 and operate under the normal key arrangement. Further, note that the central pail in the horizontal direction in the vertically long state and in the horizontally long state of the first housing 3 are respectively positioned at the central part of the horizontal direction of the second housing 5. Furthermore, an upper side 3*b* (left side in the vertically long state) of the first housing 3 in the horizontally long state and an upper side 5*a* of the second housing 5 match to provide a fine appearance.

Figure 5B:
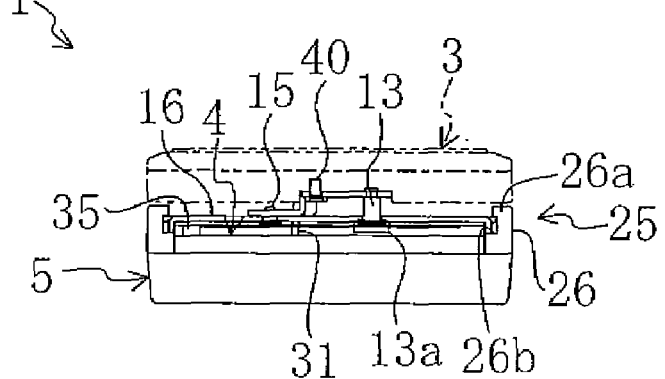
FIG. 5B is a bottom view.
Figure 9:
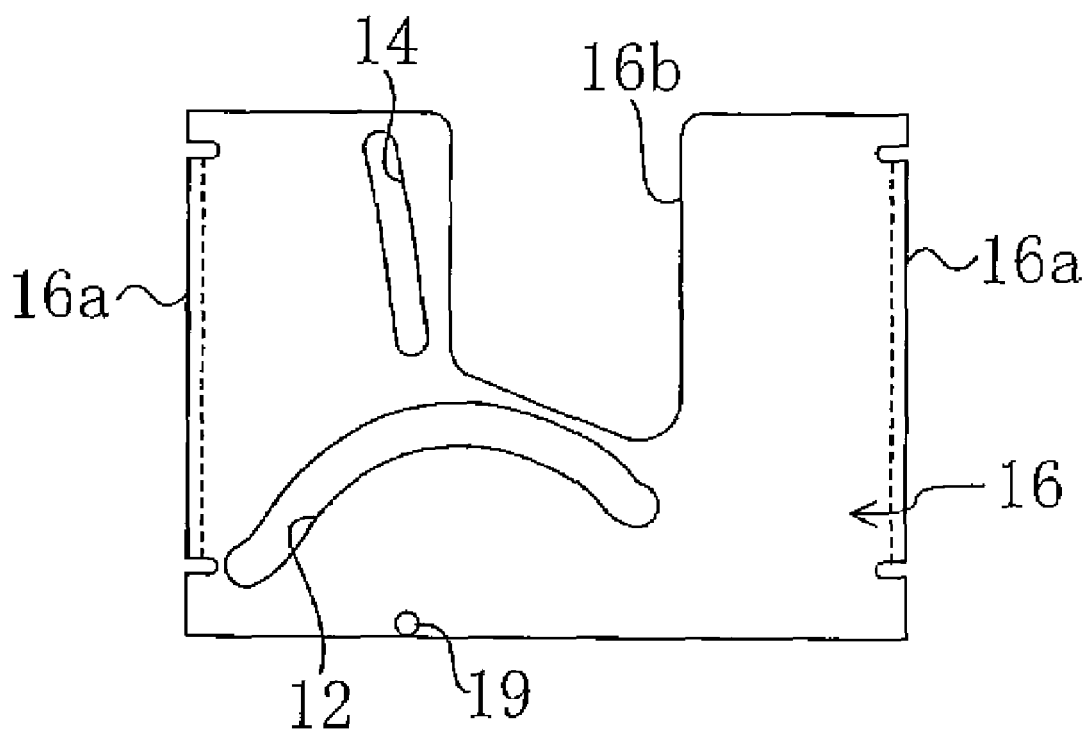
FIG. 9 is a front view of a plate part.

As shown in FIG. 5, the slide mechanism 25 is provided with a rail part 26 which extends in the vertical direction on the surface of the second housing 5. This rail part 26 has a pair of parallel rod-like members 26*a* and concave grooves 26*b* respectively provided in the rod-like members 26*a*. The slide mechanism 25 is provided between the back side of the first housing 3 and the surface of the second housing 5, and has a plate part 16 which slidingly moves on the rail pail 26. As shown in FIG. 9, this plate part 16 is made of, for example, sheet metal. In the case of sheet metal, processing is easy and low cost. This plate part 16 has a bend part 16*a* which is bent to the back side on the horizontal sides. By inserting the bend part 16*a* into the rail part 26, the plate part 16 is made slidably moveable up and down on the rail part 26 and prevented from being pulled out of the rail part 26. For example, by providing stoppers 26*c* on the upper and lower ends of the rail part 26, the range of the sliding movement is restricted. The first housing 3 is supported by the plate part 16 through a cam mechanism 10 serving as a support mechanism, and when this first housing 3 is slidably moved to the upper end side of the second housing 5, the operating part 4 of the second housing 5 appears.

Figure 6A:
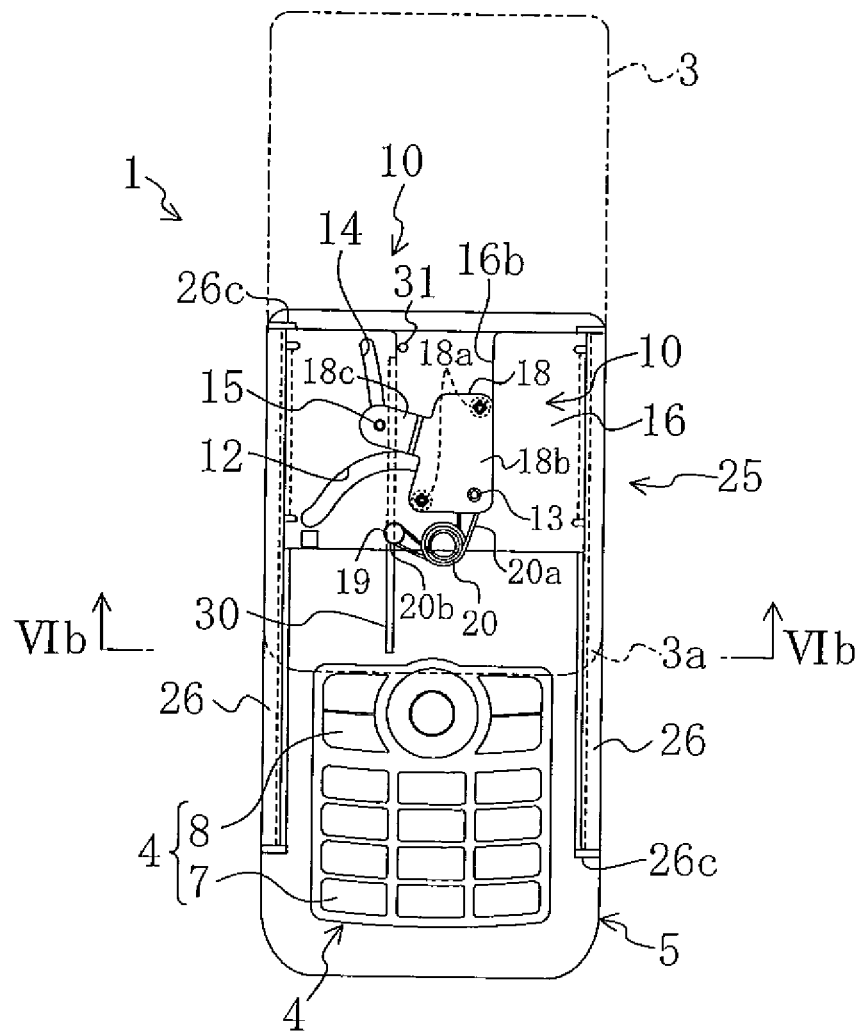
FIG. 6A is a front view.
Figure 6B:
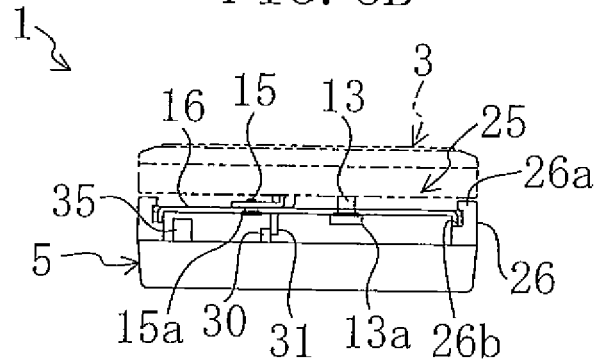
FIG. 6B is a bottom view.
Figure 7A:
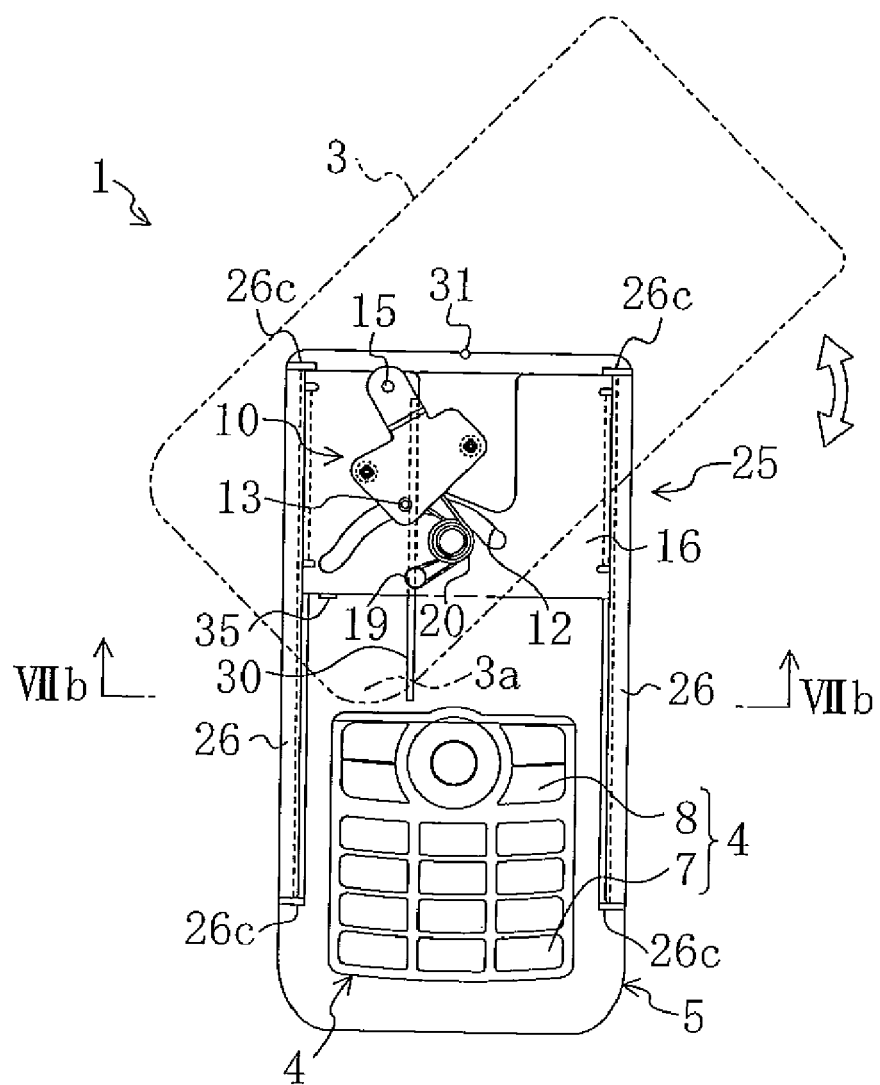
FIG. 7A is a front view.
Figure 7B:
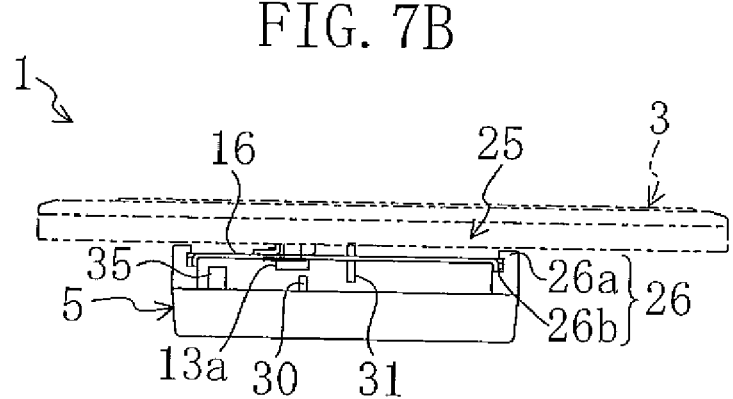
FIG. 7B is a bottom view.
Figure 8A:
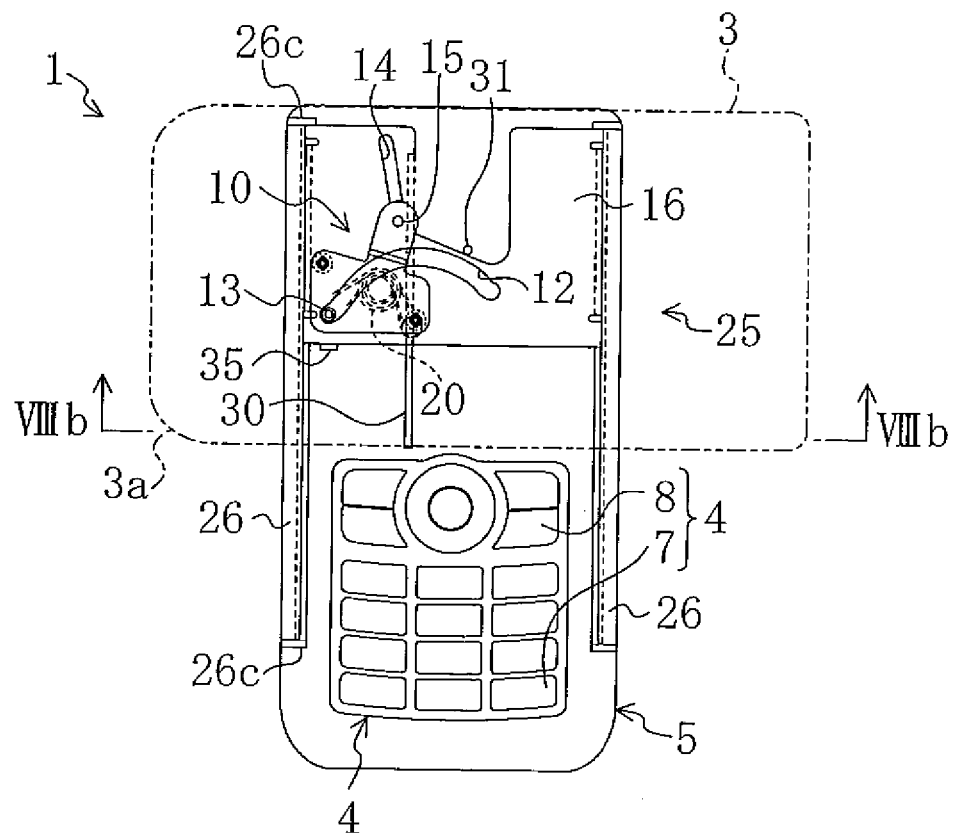
FIG. 8A is a front view.
Figure 8B:
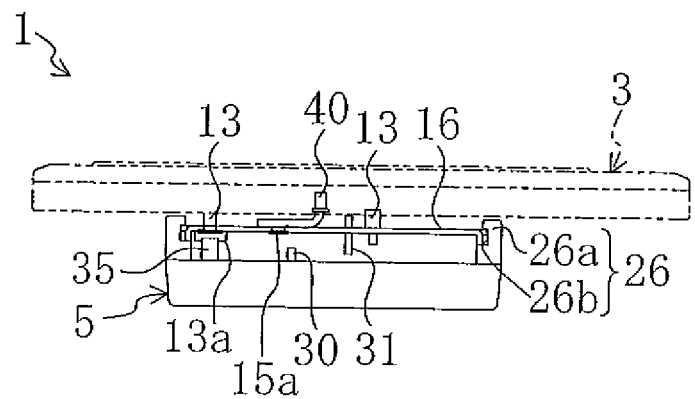
FIG. 8B is a bottom view.

FIG. 6 shows a state where the first housing 3 is slidingly moved upward and positions to which each pin and each protrusion move. FIG. 7 shows a state where the first housing is turned clockwise after its upward sliding movement. FIG. 8 shows a state where the first housing is turned further clockwise from the state of FIG. 7 to be switched from the vertically long state to the horizontally long state.

As shown in FIGS. 6 to 9, the cam mechanism 10 is provided on the plate part 16. The cam mechanism 10 supports the first housing 3 in a manner that makes it switchable between the vertically long state and the horizontally long state. The cam mechanism 10 includes: a curved horizontal guide groove 12 provided on the plate part 16, extending in the horizontal direction, and curved in a moderately convex form; a straight line vertical guide groove 14 provided on the plate part 16 and extending in the vertical direction; a first guide pin 13 provided on the back side of the first housing 3 and slidably engaging with the horizontal guide groove 12; and a second guide pin 15 provided on the back side of the first housing 3 and slidably engaging with the vertical guide groove 14.

That is, the horizontal guide groove 12 is made up of an opening curved in a moderately convex form, so that when the sliding type mobile phone is seen from the surface, the central part is offset to the left side of the first housing 3. The vertical guide groove 14 is made up of a periphery part of a straight line opening provided on the upper side of the uppermost part of the moderately convex form of the horizontal guide groove 12. When the first housing 3 is in the vertically long state, the second guide pin 15 is positioned to a somewhat lower left side from the central part of the first housing 3 when seen from the surface side of the sliding type mobile phone 1.

On the other hand, on the back side of the first housing 3, a link member 18 made of metal is attached. This link member 18 has a plate-form attaching part 18*b* provided with through holes 18*a* for fastening and positioning on the back side of the first housing 3 and a tip part 18*c* continuing from this attaching part 18*b* in an L form in a side view. The first guide pin 13 is provided to extend vertically to one end side of the link member 18, that is, a tip of the attaching part 18*b* on the plate part 16 side. The second guide pin 15 is provided to extend vertically to the other end side of the link member 18, that is, an end part of the tip part 18*c* on the plate part 16 side. These guide pins 13 and 15 respectively have on the tips annular parts 13*a* and 15*a* having larger diameter than the guide grooves 12 and 14. These annular parts 13*a* and 15*a* slide respectively around the peripheries of the guide grooves 12 and 14. This prevents the guide pins 13 and 15 from being pulled out of the guide grooves 12 and 14, so that the first housing 3 may not be removed off the plate part 16. The annular part 13*a* of the first guide pin 13 protrudes further toward the back side than the annular part 15*a* of the second guide pin 15.

In this manner, the link member 18 is attached to the first housing 3 with the first guide pin 13 and the second guide pin 15 provided on the back side and the surface side fastened to first housing 3 by screws 40 pierced through the through holes 18*a*. By attaching the link member 11 to the first housing 3, the first guide pin 13 and the second guide pin 15 are attached to preset positions of the first housing 3.

As shown ill FIG. 9, the vertical guide groove 14 is inclined relative to the rail part 26 (bend part 16*a*). Further, on the upper side of the central part of the plate part 16, a contact preventing opening 16*b* with an open upper end is formed. In this manner, by adjusting the angle of inclination of the vertical guide groove 14, the guide groove 12 can be made into a circular arc shape, thereby making the switching operation of the first housing 3 smooth. Further, since the vertical guide groove 14 is inclined, when the contact preventing opening 16*b* is provided, it is easier to establish a reinforcement between the vertical guide groove 14 and the contact preventing opening 16*b*. On the lower side central part surface of the plate part 16, a spring fixed pin 19 is provided to protrude to the surface side.

As shown FIGS. 6 to 8, the cam mechanism 10 is provided with a torsion coil spring 20 serving as an elastic member to bias the first housing 3 to the vertically long state or the horizontally long state, one end 20*a* of the torsion coil spring 20 being fixed to the first guide pin 13 and the other end 20*b* being fixed to the spring fixed pin 19. The torsion coil spring 20 is supported to be horizontally swingable about the spring fixed pin 19. The elastic power of the torsion coil spring 20 biases the first housing 3 from the vertically long state to the horizontally long state and biasing the first housing 3 from the horizontally long state to the vertically long state. Alternatively, priority for the biasing may be given to the vertically long state or the horizontally long state. In this manner, it is possible for the user to switch to the vertically long state or to the horizontally long state in one touch with a single hand.

Further, the torsion coil spring 20 is so arranged as to be most compressed in the vicinity of the top point (shown in FIG. 7) of the horizontal guide groove 12. As a result, the power of the torsion coil spring 20 is stored utmost in the vicinity of the top point of the horizontal guide groove 12, and by crossing this top point, switching from the vertically long state to the horizontally long state or from the horizontally long state to the vertically long state is aided by the torsion coil spring 20.

In this manner, by making a structure where the cam mechanism 10 is provided on the plate part 16, which slidingly moves on the rail part 26, it is possible to perform the sliding movement and the switching operation to the vertically long state or the horizontally long state surely on a simple structure. Further, since the plate part 16 and the cam mechanism 10 are provided in a limited space between the back side of the first housing 3 and the surface of the second housing 5, the sliding type mobile phone 1 is rendered compact.

The plate part 16, the link member 18, and the torsion coil spring 20 are so constituted as to be capable of unit assembly. Attaching the unit-assembled cam mechanism 10 to the first housing 3 facilitates assembly of the cam mechanism 10, while at the same time, the first guide pin 13 and the second guide pin 15 are arranged respectively in the guide grooves 12 and 14 with good accuracy. Further, by inserting the plate part 16 into the rail part 26, the first housing 3 can be easily incorporated into the second housing 5. Further, by making up the cam mechanism 10 with a metal member, its movement is made smooth and its rigidity can be enhanced.

On the surface of the second housing 5, a restrictive protrusion 30 is formed as a first restrictive member. The restrictive protrusion 30 is made of a straight line protrusion extending to a preset height in the vertical direction, thereby restricting switching of the first housing 3 from the vertically long state to the horizontally long state while the first housing 3 is slidably moving relative to the second housing 5. On the other hand, on the back side somewhat to the left when seen from the surface of the first housing 3, there is protrudingly provided a rotation preventing protrusion 31. The rotation preventing protrusion 31 sticks out further toward the second housing 2 side than the first guide pin 13 and the second guide pin 15.

By this configuration, the restrictive protrusion 30 is positioned in the vicinity of the rotation preventing protrusion 31 to restrict the movement of the rotation preventing protrusion 31, thereby restricting switching of the first housing 3 from the vertically long state to the horizontally long state. Specifically, the configuration is such that while the first housing 3 slidingly moves relative to the second housing 5, the rotation preventing protrusion 31 slidingly moves in the vicinity of the restrictive protrusion 30, whereupon the rotation preventing protrusion 31 abuts on the restrictive protrusion 30 during that time so that the rotation preventing protrusion 31 cannot move to the left, thus restricting rotation of the first housing 3. Upon completion of the sliding movement, the rotation preventing protrusion 31 moves away from the restrictive protrusion 30 and thus is able to move to the left, thus releasing the restriction against the rotation of the first housing 3. With the above simple configuration, the restriction of the rotation preventing protrusion 31 is carried out.

Further, since the contact preventing opening 16b is formed on the plate part 16, contact between the plate part 16 and the rotation preventing protrusion 31 is prevented. Still further, since the contact preventing opening 16b is formed by cutting, lighter weight and compactness are made possible by the cut part. Further, the rotation preventing protrusion 31 is prevented from contacting with the plate part 16 while the first housing 3 is being switched from the vertically long state to the horizontally long state.

On the surface of the second housing 5 positioned in the vicinity of the first guide pin 13 when the first housing 3 is in the horizontally long state, there is protrudingly provided a restrictive protrusion 35 as a second restrictive member. This restrictive protrusion 35 restricts the movement of the first guide pin 13, which in turn restricts the sliding movement of the first housing 3. That is, in the state where the sliding movement of the first housing 3 is completed and switching from the vertically long state to the horizontally long state has been made, the recurrence of the downward sliding movement of the first housing 3 is restricted by abutting of the restrictive protrusion 35 on the annular part 13a of the first guide pin 13.

Operation

Next, operation of the sliding type mobile phone 1 according to this embodiment will be described.

Firstly, as shown in FIG. 1, when the sliding type mobile phone 1 is in a standby state, there is provided a pre-slide state where the first housing 3 is not slidingly moving relative to the second housing 5. Here the liquid crystal display part 2 appears to the surface, and thus TV viewing is possible even in this condition.

Next, as shown in FIG. 2, the first housing 3 slidingly moves upward relative to the second housing 5. If an attempt is made to switch the first housing 3 from the vertically long state to the horizontally long state while the first housing 3 is slidingly moving, then, as shown in FIG. 5, the rotation preventing protrusion 31 abuts on the restrictive protrusion 30, which restricts the leftward movement of the rotation preventing protrusion 31. Consequently, the first housing 3 is not switched to the horizontally long state. This makes the sliding movement stable and reliable. Further, as the plate part 16 slidingly moves on the rail part 26 of the second housing 5, the first housing 3 supported through the cam mechanism 10 slidingly moves to the upper side of the second housing 5, whereby the operating part 4 appears. In normal conversation or sending or receiving e-mail, the liquid crystal display part 2 is set at the vertically long state and used by inputting with keys on the operating part 4.

On the other hand, when the user desires to see horizontally long images such as for viewing terrestrial digital TV broadcasting or preparing or reading e-mail in English, then the user rotates the first housing 3 while the operating part 4 is in the state of appearance and switches the first housing 3 from the vertically long state to the horizontally long state. At this time, as shown in FIG. 6, as the rotation preventing protrusion 31 moves away from the restrictive protrusion 30 upon completion of the sliding movement, the restriction of the rotation preventing protrusion 31 is released so that the leftward movement is made possible. That is, the first housing 3 is switchable from the vertically long state to the horizontally long state. By setting height of the restrictive protrusion 30 such that there is no contact with the first guide pin 13 and the second guide pin 15 but contact with the rotation preventing protrusion 31, while restricting switching of the first housing 3 from the vertically long state to the horizontally long state during the sliding movement, it is possible through a simple configuration to enable the switching operation of the first housing 3 to be made after the sliding movement.

First, the user turns the first housing 3 in the state of FIG. 6 clockwise when seen from the surface against the biasing power of the torsion coil spring, thereby moving the lower end side corner part 3a to a position shown in FIG. 7. At this time, the second guide pin 15 which was at the lower end of the vertical guide groove 14 when seen from the surface of the sliding type mobile phone 1 moves to the upper end, and the first guide pin 13 which was at the right end of the horizontal guide groove 12 moves to the central part.

Next, when the maximum angle of flexure is exceeded, while the first housing 3 is being aided by the biasing power, the first housing 3 switched to the horizontally long state. At this time, as shown in FIG. 7 and FIG. 8, the second guide pin 15 which was at the upper end of the vertical guide groove 14 when seen from the surface of the sliding type mobile phone 1 moves to the lower end, and the first guide pin 13 which was in the central part of the horizontal guide groove 12 moves to the left end.

In this manner, through the cam mechanism 10, at the same instant when the first guide pin on 13 the back side of the first housing 3 slidingly moves to the left in the horizontal guide groove 12, the second guide pin 15 on the back side of the first housing 3 slidingly moves up and down in the vertical guide groove 14.

Figure 10:
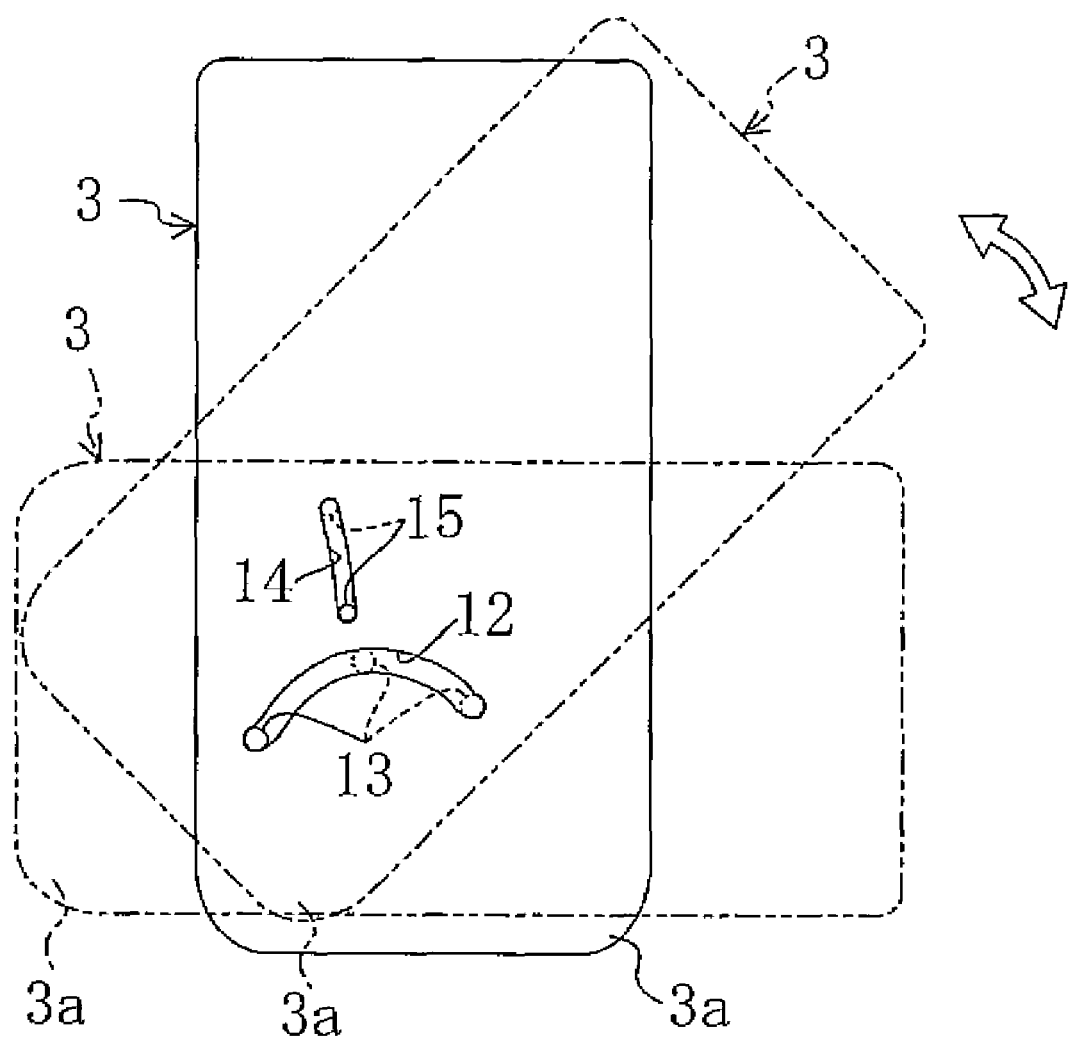
FIG. 10 is an explanatory diagram showing a trajectory of a corner part of the lower end side of the first housing.

FIG. 10 shows a trajectory drawn by the lower end side corner part 3a due to the movement restriction by the cam mechanism 10. The lowermost end part at the time of switching is guided and supported for moving by a straight line trajectory which maintains a preset gap with the function buttons 8. Consequently, since the first housing 3 does not move to a lower side than this trajectory, the first housing 3 never contacts with the functional buttons 8. Further, the movement at the time of switching between the vertically lon-g state and the horizontally long state of the first housing 3 is rendered smooth, thereby facilitating the switching operation.

Even in the horizontally long state shown in FIG. 4, the central part in the horizontal direction of the first housing 3 is positioned substantially in the central part in the horizontal direction of the first housing 3. When the first housing 3 is in the horizontally long state, the operating part 4 appears on the lower side presenting a substantially T shape when seen from the surface. Thus, the liquid crystal display part 2 is set to display large, horizontally long images, so that the user, while inputting with keys on the operating part 4, may participate in quiz programs from TV or use TV shopping, bank remittance and other services through TV. When the first housing 3 is in the horizontally long state, the first housing 3 is also positioned substantially on the center in the horizontal direction of the second housing 5. Moreover, as shown in FIG. 4, when the first housing 3 is switched from the vertically long state to the horizontally long state, the upper side 3b of the first housing 3 in the horizontally long state matches the upper side 5a of the second housing 5. As a result, when the first housing 3 is in the horizontally long state, the first housing 3 does not protrude from the upper end of the second housing 5. Accordingly, when the user has the mobile phone with a single hand or puts it on the desk, its stability is good with fine appearance as well.

When the first housing 3 is in the horizontally long state, the annular part 13a of the first guide pin 13 moving horizontally during the switching operation of the first housing 3 abuts on the restrictive protrusion 35, thereby restricting downward movement. This prevents the sliding movement of the first housing 3. Insofar as the first guide pin 13 remains in this position, the first housing 3 does not slidingly move due to the restrictive protrusion 35, and hence, the horizontally long state is surely maintained. This improves operability in the horizontally long state. Since the restrictive protrusion 35 is made up of a protrusion, all that is needed is a small space to occupy, and the possibility that the restrictive protrusion 35 may impede the switching operation and the sliding movement of the first housing 3 is prevented.

On the other hand, after the horizontally long state is returned to the vertically long state, the first guide pin 13 moves to the right side away from the restrictive protrusion 35, so that the first housing 3 can slidingly move downward. In this manner, the sliding movement of the first housing 3 can be easily released.

Further, after use, contrary to the foregoing, the user turns the lower end side corner part 3a on the right side of the first housing 3 counterclockwise when seen from the surface against the biasing power of the torsion coil spring, and when the torsion coil spring 20 exceeds the maximum angle of flexure while being aided by the biasing power, the first housing 3 returns to the vertically long state.

Further, the first housing 3 is slidably moved relative to the second housing 5 to be in a standby state.

Consequently, according to the sliding type mobile phone 1 of this embodiment, while realizing overall compactness, the first housing 3 is held stably to enable sliding movement and switching operation between the vertically long state and the horizontally long state, whereas when the first housing 3 is put in the horizontally long state, operation becomes possible under the normal key arrangement.

Other Embodiments

In the present invention, the embodiment may be configured as follows.

That is, while in the embodiment the vertical guide groove 14 is inclined relative to the rail part 26, the vertical guide groove 14 may be provided parallel to the rail part 26. Further, as shown in FIG. 11, the vertical guide groove 14 may have a curvilinear shape. This makes it possible to bend the vertical guide groove 14 as necessary, whereupon by adjusting the shape of the vertical guide groove 14 accordingly, the movement of the first housing 3 may be made smooth, and by cutting a member forming the vertical guide groove 14, lighter weight and compactness are made possible by the cut part.

In the embodiment, through the cam mechanism 10, the first housing 3 is guided and supported so that the lower end side corner part 3a may move along a straight line trajectory. However, the movement is along a curvilinear trajectory.

In the embodiment, the cam mechanism 10 is such that the first housing 3 is switched clockwise when seen from the surface from the vertically long state to the horizontally long state. However, the switching m-nay be counterclockwise.

In this manner; by devising the groove shape and arrangement of the cam mechanism 10, it is possible to control the trajectory of rotational movement in proper switching operation of the first housing 3.

Further, in the embodiment, the central part in the horizontal direction in the vertically long state and in the horizontally long state of the first housing 3 is positioned substantially in the center part in the horizontal direction of the first housing 3, but this may be offset either to right or left.

While in the embodiment, the display part is the liquid crystal display part 2, the display part may be an organic EL display. The organic EL display has small power consumption because of its light-emitting property. By comparison to the liquid crystal display, it has a large viewing angle and requires no back light, thus enabling a thin type to be made.

The plate part 16 may be a magnesium alloy molded product. This enables a lightweight, thin type plate part 16 of high rigidity and durability, and overall strength is maintained even if the guide grooves 12 and 14 as well as the contact preventing opening 16b are formed.

In the embodiment, the sliding type mobile terminal is a mobile phone. But mobile wireless communication equipment such as PES, PDA, PC, and mobile communication tools is acceptable. The point is that insofar as the first housing 3 and the second housing 5 are slidably coupled together with a vertically long display pail, any mobile terminal is acceptable.

The embodiment is drawn to the sliding type mobile phone 1 provided with the first housing 3 having on its surface the liquid crystal display part 2 which is vertically long in the vertical direction. However, it may be a sliding type mobile terminal provided with the first housing 3 having on its surface a horizontally long liquid crystal display part 2 in the horizontal direction. In this case, the slide mechanism is provided with a rail part which extends on the surface of the second housing in the horizontal direction. When the first housing is slidingly moved to the right end side or the left end side of the second housing, the operating part of the second housing appears, with a support mechanism to support the first housing relative to the second housing in a switchable manner between the vertically long state and the horizontally long state. This allows the key operation in the normal horizontally long state to be also conducted with the display part vertically long.

It should be noted that the embodiments are intrinsically preferred examples and not intended to limit the scope of the present invention, its applications and usage.

What is claimed is:

1. A sliding type mobile terminal, comprising:
    a first housing having on a surface thereof a vertically long display part in a vertical direction;
    a second housing having on a surface thereof an operating part;
    a slide mechanism slidably coupling the first housing and the second housing; and
    a support mechanism supporting the first housing in a manner that makes the first housing switchable between a vertically long state and a horizontally long state relative to the second housing,
    wherein the slide mechanism is provided with a rail part mounted to extend in the vertical direction on the surface of the second housing such that the operating part of the second housing appears when the first housing is slidingly moved toward an upper end side of the second housing, and
    wherein the support mechanism includes,
    a curved horizontal guide groove extending substantially in a horizontal direction, and curved in a moderately convex form, and
    a vertical guide groove provided independently from the curved horizontal guide groove, without merging the curved horizontal guide groove, and extending substantially in the vertical direction.

2. The sliding type mobile terminal according to claim 1, wherein:
    the slide mechanism is disposed between a back side of the first housing and the surface of the second housing and is provided with a plate part slidingly moving on the rail part; and
    the support mechanism is disposed on the plate part.

3. The sliding type mobile terminal according to claim 2, wherein the support mechanism is constituted of a cam mechanism.

4. The sliding type mobile terminal according to claim 3, wherein the cam mechanism supports the first housing while guiding switching of the first housing between a vertically long state and a horizontally long state such that a lower end side corner part of the first housing moves on a straight line trajectory.

5. The sliding type mobile terminal according to claim 3, wherein a central part in the vertically long state and in the horizontally long state of the first housing are positioned substantially at a central part in the horizontal direction of the second housing.

6. The sliding type mobile terminal according to claim 3, wherein when the first housing is in the horizontally long state, the operating part appears from a down side, presenting a substantially T-shape when seen from the surface.

7. The sliding type mobile terminal according to claim 3, wherein when the first housing is switched from the vertically long state to the horizontally long state, an upper side of the first housing in the horizontally long state and an upper side of the second housing match.

8. The sliding type mobile terminal according to claim 3, wherein the cam mechanism includes,
    the curved horizontal guide groove and the vertical guide groove provided on the plate part;
    a first guide pin provided on the back side of the first housing and slidably engaging with the horizontal guide groove; and
    a second guide pin provided on the back side of the first housing and slidably engaging with the vertical guide groove.

9. The sliding type mobile terminal according to claim 8, further comprising:
    a first restrictive member restricting switching of the first housing from the vertically long state to the horizontally long state while the first housing slidingly moves relative to the second housing.

10. The sliding type mobile terminal according to claim 9, wherein:
    the first housing has a rotation preventing protrusion disposed in a protruding manner on the back side of the first housing; and
    the first restrictive member restricts movement of the rotation preventing protrusion by engaging with the rotation preventing protrusion.

11. The sliding type mobile terminal according to claim 10, wherein the first restrictive member is made up of a straight line restrictive protrusion provided on the surface of the second housing and is positioned in the vicinity of the rotation preventing protrusion to restrict switching of the first housing from the vertically long state to the horizontally long state.

12. The sliding type mobile terminal according to claim 11, wherein:
    while the first housing slidingly moves relative to the second housing, the rotation preventing protrusion slidingly moves in the vicinity of the restrictive protrusion; and
    upon completion of the sliding movement, the rotation preventing protrusion moves away from the restrictive protrusion.

13. The sliding type mobile terminal according to claim 10, wherein the rotation preventing protrusion sticks out further to the second housing side than the first guide pin and the second guide pin.

14. The sliding type mobile terminal according to claim 10, wherein the plate part is provided with a contact preventing opening with an open upper side to prevent contact with the rotation preventing protrusion.

15. The sliding type mobile terminal according to claim 8, further comprising:
    in the state where the vertically long state is switched to the horizontally long state upon completion of the sliding movement of the first housing, a second restrictive member restricting recurrence of sliding movement of the first housing.

16. The sliding type mobile terminal according to claim 15, wherein the second restrictive member restricts movement of the first guide pin.

17. The sliding type mobile terminal according to claim 16, wherein the second restrictive member is made up of a restrictive protrusion disposed in a protruding manner in the vicinity of the first guide pin in the second housing when the first housing is in the horizontally long state to restrict downward sliding movement of the first housing.

18. The sliding type mobile terminal according to claim 8, wherein the support mechanism is provided with an elastic member with one end fixed to the first guide pin and the other end fixed to the plate part, thereby biasing the first housing to secure that the display part is in the vertically long state or in the horizontally long state.

19. The sliding type mobile terminal according to claim 18, wherein the elastic member is so arranged as to be most compressed in the vicinity of a top point of the horizontal guide groove.

20. The sliding type mobile terminal according to claim 18, wherein the elastic member is a torsion coil spring.

21. The sliding type mobile terminal according to claim 8, wherein:
the support mechanism is provided with a link member;
the first guide pin and the second guide pin are provided on a back side of the link member; and
a surface side is attached to the first housing.

22. The sliding type mobile terminal according to claim 21, wherein the plate part and the link member are assembled in a unit.

* * * * *